United States Patent
Sakamoto et al.

(10) Patent No.: US 12,017,306 B2
(45) Date of Patent: Jun. 25, 2024

(54) SOLDER PASTE

(71) Applicant: SENJU METAL INDUSTRY CO., LTD., Tokyo (JP)

(72) Inventors: Takeshi Sakamoto, Tokyo (JP); Yoshie Tachibana, Tokyo (JP); Shunsuke Koga, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/770,305

(22) PCT Filed: Apr. 9, 2019

(86) PCT No.: PCT/JP2019/015388
§ 371 (c)(1),
(2) Date: Jun. 5, 2020

(87) PCT Pub. No.: WO2019/198690
PCT Pub. Date: Oct. 17, 2019

(65) Prior Publication Data
US 2020/0398382 A1  Dec. 24, 2020

(30) Foreign Application Priority Data
Apr. 13, 2018 (JP) ................................ 2018-078041

(51) Int. Cl.
*B23K 35/26* (2006.01)
*B23K 35/02* (2006.01)
*C22C 13/02* (2006.01)

(52) U.S. Cl.
CPC ........ *B23K 35/262* (2013.01); *B23K 35/0244* (2013.01); *C22C 13/02* (2013.01)

(58) Field of Classification Search
CPC .... B23K 35/0244; B23K 35/262; C22C 13/02
See application file for complete search history.

(56) References Cited

U.S. PATENT DOCUMENTS 8,968,488 B2  3/2015 Yamashita et al.
2004/0262779 A1* 12/2004 Amagai ............... B23K 35/262
420/560

(Continued)

FOREIGN PATENT DOCUMENTS

| JP | H05-50286 A | 3/1993 |
| JP | 2005-000956 A | 1/2005 |

(Continued)

OTHER PUBLICATIONS

ASM Handbook, vol. 6: Welding, Brazing, and Soldering D.L. Olson, T.A. Siewert, S. Liu, and G.R. Edwards, editors, p. 126-137 DOI: 10.31399/asm.hb.v06.a0001346 (Year: 1993).*

*Primary Examiner* — Nicholas A Wang
(74) *Attorney, Agent, or Firm* — The Webb Law Firm (57) ABSTRACT

The present invention provides a solder paste that suppresses generation of voids and has excellent reliability. A solder paste contains Sn-based powder, SnSb-based alloy powder with Sn and 10 mass % or more of Sb, and flux, wherein a liquidus temperature of the SnSb-based alloy powder is higher than a liquidus temperature of the Sn-based powder, and a content ratio of the Sn-based powder and the SnSb-based alloy powder is 75:25 to 95:5. Preferably, the content ratio of the Sn-based powder to the SnSb-based alloy powder is 80:20 to 90:10.

10 Claims, 3 Drawing Sheets

(56) References Cited

U.S. PATENT DOCUMENTS

| | | | | |
|---|---|---|---|---|
| 2008/0292492 A1* | 11/2008 | Ingham | ............... | C22C 13/02 |
| | | | | 228/56.3 |
| 2008/0292493 A1* | 11/2008 | Lee | ............... | B23K 35/262 |
| | | | | 420/560 |
| 2014/0199115 A1* | 7/2014 | de Avila Ribas | .... | B23K 35/025 |
| | | | | 403/272 |
| 2014/0219711 A1* | 8/2014 | Pandher | ............ | B23K 35/0244 |
| | | | | 219/616 |
| 2015/0328722 A1* | 11/2015 | Suzuki | ............... | C22C 13/00 |
| | | | | 403/272 |
| 2020/0001406 A1* | 1/2020 | Xu | ............... | B23K 35/0244 |
| 2020/0353572 A1* | 11/2020 | Zhang | ............... | B23K 1/203 |

FOREIGN PATENT DOCUMENTS

| | | | |
|---|---|---|---|
| JP | 2005000956 | * | 1/2005 |
| JP | 2005118800 | * | 5/2005 |
| JP | 2005-254254 A | | 9/2005 |
| JP | 5142999 B2 | | 2/2013 |
| JP | 2018-058090 A | | 4/2018 |
| JP | 2018-058090 A | | 4/2018 |
| KR | 20030042867 | * | 6/2003 |
| WO | WO2007023288 | * | 3/2007 |
| WO | WO-2019/100445 A1 | | 5/2019 |

\* cited by examiner

SOLDER PASTE

BACKGROUND OF THE INVENTION

Technical Field

The present invention relates to a solder paste that suppresses generation of voids and has excellent reliability.

Background Art

In recent years, parts composed only of mechanical components for automobiles are replaced by electrical components to achieve higher functionality and higher performance of the vehicles. In order to realize higher functionality and higher performance of vehicles, electronics packaging technology is needed that is adapted for small size and high density. In order to adapt to this mounting technology, high reliability of a solder joint for connecting a printed circuit board and an electronic component is required.

For example, a printed circuit board mounted near an engine is required to be used for a longtime under a considerable temperature difference. Hybrid vehicles are equipped with an inverter that handles high electric power, and require solder joints that can withstand the driving temperature of the inverter. Thus, in the electronics mounting technology for vehicles, solder alloy forming the solder joint needs to have high reliability.

Here, a lead-free Sn-based solder alloy has conventionally been used for the reason of suppressing concerns about environmental pollution due to the solder alloy. Among these, an Sn-3Ag-0.5Cu solder alloy is widely used because of its good wettability. For example, an Sn-based solder alloy containing Sb as described in Patent Document 1 is one of solder alloys with higher reliability than the above-mentioned solder alloy. Sb is an element which can improve the reliability of the solder alloy by solid solution deposition strengthening and/or by deposition dispersion strengthening under forming fine SnSb-intermetallic compound. The Sn-based solder alloy containing Sb is used as a solder paste obtained by adding this alloy powder to a flux. However, since the liquidus temperature of the solder alloy containing Sb is about 5 to 10° C. higher than that of the Sn-3Ag-0.5Cu solder alloy, the reflow temperature needs to be increased by 5 to 10° C. when mounting electronic components. If the reflow temperature is set high, the electronic components mounted on the printed circuit board are exposed to a high temperature environment, and some components may be thermally damaged.

As a mounting technique using solder alloy powder containing Sb, e.g. Patent Document 2 discloses a lead-free solder with a first alloy powder made of a Sn-based solder alloy, and a second alloy powder with a melting point higher than that of the first alloy powder, the second alloy powder made of a Sb alloy containing at least one of Ag, Al, Au, Bi, Co, Cr, Cu, Fe, Ge, In, Mg, Mn, Pd, Si, Sr, Te and Zn. For the lead-free solder described in Patent Document 2, since only the first alloy powder melts when melting, a solder joint containing Sb is formed at a reflow temperature similar to that for a solder alloy containing no Sb. The document also states that the second alloy phase can be contained under uniform dispersion into the first alloy phase while maintaining characteristics such as wettability of the first alloy phase. Furthermore, the document describes that after bonding, an intermetallic compound phase is formed on a surface of the second alloy powder by an alloying reaction between the first alloy powder and the second alloy powder.

Patent Document 3 discloses a cream solder with a first powder alloy made of a Sn—Ag—Cu-based alloy containing 10 to 30 mass % of Ag and 2 to 20 mass % of Cu, and a second Sn-based powder containing 8 mass % or less of Sb. Patent Document 3 describes that the Sb content is set to 8 mass % or less in order to suppress an increase in viscosity due to a rise of the liquidus line of the Sn—Sb system.

CITATION LIST

Patent Literature

Patent Document 1: JPH 05-50286 A
Patent Document 2: JP 2005-254254 A
Patent Document 3: JP 5142999 B

SUMMARY OF THE INVENTION

According to the invention described in Patent Document 2, the second alloy powder contains Sb and does not contain Sn in order to maintain the solid phase of the second alloy powder during reflow. Further, the document describes that the second alloy powder is uniformly dispersed in the first alloy phase while maintaining characteristics such as wettability of the first alloy phase. That is, Patent Document 2 provides that the initial form of the second alloy powder at the time of introducing is maintained, and the second alloy powder is dispersed in the first alloy phase. However, the second alloy powder can be easily oxidized due to containing Sb and has poor wettability, may not be molten into the first alloy powder which has been molten during reflow and voids are difficult to be discharged to the outside. This may result in generation of voids in a solder joint. The document also describes that an intermetallic compound phase of the first alloy powder and the second alloy powder is formed on a surface of the second alloy powder after reflow. According to the invention described in the document, only a surface of the second alloy powder is compatible with the first alloy powder, and the second alloy powder is not molten into the first alloy phase. Therefore, voids are not discharged to the outside after reflow, and voids are generated in the solder joint.

Also, the invention described in Patent Document 3 aims to increase the content of Ag and Cu in order to achieve a wider temperature range of a solid-liquid coexistence region and increase the viscosity of the molten solder during reflow. In order to achieve this object, according to the invention described in Patent Document 3, a first powder alloy containing a larger amount of Ag and Cu in order to increase the liquidus temperature which has a semi-molten state during reflow, and an Sb-containing powder alloy are mixed, wherein a ratio of first powder alloy and Sb-containing powder alloy is 3:1. Thus, according to Patent Document 3, there is a problem that due to the increased viscosity of the molten solder, air confinements between the alloy powders remain inside the solder joint after reflow and voids are generated in the solder joint.

Generation of voids in the solder joint may lead to an inferior reliability for the solder joint even if the reliability of the solder alloy itself forming the solder joint is high. For this reason, in recent years, it is desired for applications with high reliability requirements to form a solder joint in which the generation of voids is suppressed.

Therefore, an objective of the present invention is to provide a solder paste which suppresses generation of voids and has excellent reliability.

As described above, the solder pastes using two types of powders according to Patent Documents 2 and 3 cannot suppress generation of voids. The present inventors have studied to extract a problem related to voids by using a solder paste containing one type of solder powder containing Sb in order to secure bonding reliability. When one type of solder powder containing Sb is used, the reflow temperature should be 5 to 10° C. higher than in case of using Sn-3Ag-0.5Cu solder powder. However, since an increase in the reflow temperature imposes a thermal load on an electronic component, it is desired that the temperature is not too high. Further, since the wettability of the Sb-containing solder powder is reduced by oxidation, an increase in the reflow temperature further reduces the wettability and generates voids.

Under the assumption that the Sb content of the solder alloy forming the solder joint should be 0.5% or more in order to secure high reliability of the solder joint, the present inventors conducted the study using two types, i.e. alloy powder containing Sb and Sn-based powders containing no Sb. In order to suppress the generation of voids, it should be provided that the first alloy powder and the second alloy powder are not compatible with each other only on their surfaces, but the second alloy powder is molten into the first alloy phase during reflow. In view of the background art, it also seems that it is better to reduce the Sb content in order to improve the wettability. However, the reliability is not ensured if the Sb content is reduced.

Therefore, the present inventors used an SnSb-based alloy powder including Sn in addition to Sb so as to exhibit high wettability between the first alloy powder and the second alloy powder even in case of increased Sb-content for purpose of ensuring reliability. And Sn-based powder was mixed with SnSb-based alloy powder so that the content of Sn-based powder with a low liquidus temperature and excellent wettability is larger. As a result, it was unexpectedly found that the reduction of the wettability due to the increased Sb content was suppressed, the second alloy powder melted into the first alloy phase and the generation of voids was suppressed, and the solder joint had excellent reliability.

The present invention completed based on this finding is as follows.

(1) Solder paste containing Sn-based powder, SnSb-based alloy powder containing Sn and 10 mass % or more of Sb and flux, wherein a liquidus temperature of the SnSb-based alloy powder is higher than a liquidus temperature of the Sn-based powder, and wherein a content ratio of the Sn-based powder and the SnSb-based alloy powder is 75:25 to 95:5.

(2) The solder paste according to the above (1), wherein the content ratio of the Sn-based powder and the SnSb-based alloy powder is 80:20 to 90:10.

(3) The solder paste according to the above (1) or (2), wherein the Sn-based powder is at least one of Sn powder, SnAg-based alloy powder containing 4 mass % or less of Ag, SnCu-based alloy powder containing 2 mass % or less of Cu, SnBi-based alloy powder containing 0-80 mass % of Bi, SnIn-based alloy powder containing 0-80 mass % of In, and SnAgCu-based alloy powder containing 4 mass % or less of Ag and 2 mass % or less of Cu.

(4) The solder paste according to any one the above (1) to (3), wherein the Sn-based powder contains at least one of P: 0.1 mass % or less, Ge: 0.1 mass % or less, Ga: 0.1 mass % or less, Ni: 0.1 mass % or less, Fe: 0.1 mass % or less, Al: 0.1 mass % or less, Pd: 0.1 mass % or less, Cr: 0.1 mass % or less, Co: 0.1 mass % or less, Zn: 10 mass % or less, Zr: 0.1 mass % or less, Mn: 0.1 mass % or less, Si: 0.1 mass % or less, Ti: 0.1 mass % or less, V: 0.1 mass % or less, Nb: 0.1 mass % or less, and Mo: 0.1 mass % or less.

(5) The solder paste according to any one of the above (1) to (4), wherein the SnSb-based alloy powder contains at least one of Ag: 25 mass % or less, Cu: 10 mass % or less, Ni: 0.1 mass % or less, P: 0.1 mass % or less, Ge: 0.1 mass % or less, Fe: 0.1 mass % or less, Bi: 20 mass % or less, Al: 0.1 mass % or less, Ga: 0.1 mass % or less, Pd: 0.1 mass % or less, Cr: 0.1 mass % or less, Co: 0.1 mass % or less, Zn: 10 mass % or less, Zr: 0.1 mass % or less, Mn: 0.1 mass % or less, Si: 0.1 mass % or less, Ti: 0.1 mass % or less, V: 0.1 mass % or less, Nb: 0.1 mass % or less, and Mo: 0.1 mass % or less.

(6) The solder paste according to any one of (1) to (5), wherein the Sn-based powder and the SnSb-based alloy powder are spherical powders having a diameter of 0.1 to 100 μm.

BRIEF DESCRIPTION OF THE DRAWINGS

FIG. 1 shows plane X-ray radiographs of solder joints after reflow with a peak temperature of 230° C., wherein FIG. 1A is a plane X-ray radiograph of Example 1, and FIG. 1B is a plane X-ray radiograph of Example 2, and FIG. 1C is a plane X-ray radiograph of Comparative Example 1.

FIG. 2 shows a cross-sectional SEM photographs of solder joints after reflow with a peak temperature of 230° C., wherein FIG. 2A is a cross-sectional SEM photograph of Example 1, FIG. 2B is a cross-sectional SEM photograph of Example 2, and FIG. 2C is a cross-sectional SEM photograph of Comparative Example 1.

DETAILED DESCRIPTION OF THE PREFERRED EMBODIMENTS

A mode for implementing the present invention will be described in detail below as an example of the present invention. In the present specification, the unit "%" related to the solder alloy composition refers to "mass %" unless otherwise specified.

1. Solder Paste

The solder paste according to the present invention comprises (1) Sn-based powder, (2) SnSb-based alloy powder containing Sn and 10% or more of Sb, and (3) flux. Each of the components will be described in detail.

(1) Sn-Based Powder

The solder paste according to the present invention contains an Sn-based powder exhibiting high wettability with SnSb-based alloy powder. Therefore, during reflow, the SnSb-based alloy powder melts into an Sn phase or an Sn-based alloy phase, which can suppress generation of voids.

A liquidus temperature of the Sn-based powder of the present invention needs to be lower than that of SnSb-based alloy powder as described below from the viewpoint of low-temperature bonding. The liquidus temperature of the Sn-based powder is preferably lower than a reflow temperature and lower than a liquidus temperature of the SnSb-based alloy powder, more preferably 30° C. or more lower than the liquidus temperature of the SnSb-based alloy powder.

Since the Sn-based powder of the present invention needs to exhibit high wettability with the SnSb-based alloy powder, the Sn-based powder is preferably Sn powder, SnAg-based alloy powder containing 4% or less of Ag, SnCu-based alloy containing 2% or less of Cu, SnBi-based alloy powder containing 0 to 80% of Bi, SnIn-based alloy powder containing 0 to 80% of In, or SnAgCu-based alloy powder containing 4% or less of Ag and 2% or less of Cu.

In these powders described above, for example, Sn-3.5Ag solder alloy powder including Ag: 3.5% and Sn as the balance is taken as the SnAg-based alloy powder. For example, Sn-0.7Cu solder alloy powder including Cu: 0.7% and Sn as the balance is taken as the SnCu-based alloy powder. For example, Sn-58Bi solder alloy powder including Bi: 58% and Sn as the balance is taken as the SnBi-based alloy powder. For example, Sn-3.0Ag-0.5Cu solder alloy powder including Ag: 3.0%, Cu: 0.5% and Sn as the balance is taken as the SnAgCu-based alloy powder.

Further, the Sn-based powder of the present invention may also contain any two or more kinds of the above-mentioned solder alloys which can achieve the wettability and the low-temperature bonding. When two or more kinds of solder alloys are contained, it is sufficient that a liquidus temperature of at least one kind of solder alloy is lower than the liquidus temperature of SnSb-based alloy powder as described later. Furthermore, from the viewpoint of low-temperature bonding, the content of the Sn-based powder exhibiting a liquidus temperature lower than the liquidus temperature of the SnSb-based alloy powder is preferably 50 mass % or more relative to the total mass of the solder paste.

Furthermore, it is desirable that the Sn-based powder of the present invention contains at least one of P, Ge and Ga in order to suppress oxidation of the molten solder during reflow and improve wettability. From the viewpoint of suppressing the generation of voids due to appropriate viscosity of the molten solder, the upper limit of the total amount of at least one of P, Ge and Ga is preferably 0.1% or less, more preferably 0.08% or less, particularly preferably 0.05% or less. Further, the upper limit of the content of P is preferably 0.1% or less, more preferably 0.08% or less. The upper limit of the content of Ge is preferably 0.1% or less, more preferably 0.08% or less. The upper limit of the content of Ga is preferably 0.1% or less, more preferably 0.08% or less.

Moreover, in order to exhibit the effect of improving the wettability, the lower limit of the total amount of at least one of P, Ge and Ga is preferably 0.001% or more, more preferably 0.01% or more, particularly preferably 0.03% or more. Further, the lower limit of the content of P is preferably 0.001% or more, and more preferably 0.01% or more. The lower limit of the content of Ge is preferably 0.001% or more, and more preferably 0.01% or more. The lower limit of the content of Ga is preferably 0.001% or more, and more preferably 0.01% or more.

Further, the Sn-based powder of the present invention may contain an additional optional element as long as the above effects are not impaired. The optional element may be at least one of Ni: 0.1% or less, Fe: 0.1% or less, Al: 0.1% or less, Pd: 0.1% or less, Cr: 0.1% or less, Co: 0.1% or less, Zn: 10% or less, and Zr: 0.1% or less, Mn: 0.1% or less, Si: 0.1% or less, Ti: 0.1% or less, V: 0.1% or less, Nb: 0.1% or less and Mo: 0.1% or less.

The Sn-based powder of the present invention preferably does not contain Sb for the reason of suppressing an increase in liquidus temperature and reduction of wettability.

In the Sn-based powder of the present invention, the balance other than the above-mentioned additional elements is Sn. In addition to the above-mentioned additional elements, unavoidable impurities may be contained. Even if unavoidable impurities are contained, the effects as described above are not affected.

(2) SnSb-Based Alloy Powder Containing Sn and 10% or More of Sb

The SnSb-based alloy powder of the present invention needs to contain Sb in order to exhibit excellent reliability of the solder joint after reflow. Sb is an element that can improve the reliability of the solder alloy due to enhancing a shear strength after a heat cycle by solid solution deposition strengthening in Sn and/or by deposition dispersion strengthening under forming fine SnSb-intermetallic compound.

In order to exhibit this effect, the SnSb-based alloy powder needs to contain at least 10% or more of Sb. The lower limit of the Sb content is preferably 12% or more, more preferably 15% or more. The upper limit of the Sb content is preferably 40% or less, more preferably 35% or less, and particularly preferably 30% or less, in order to suppress an increase in the viscosity of the SnSb-based alloy powder due to oxidation of Sb.

If the Sb content is 0.5% or more relative to the total amount of the Sn-based powder and the SnSb-based alloy powder, high reliability of the solder joint can be ensured. The Sb content is preferably 0.75% or more, more preferably 1.0% or more, further preferably 2.0% or more, particularly preferably 3.0% or more.

Further, the SnSb-based alloy powder of the present invention needs to contain Sn in order to enable generation of voids to be suppressed by improving the wettability with the Sn-based powder. When Sb-based alloy powder with no Sn is used, only a surface of the Sb alloy powder is wetted even if the aforementioned Sn-based powder is wetted with the Sb alloy powder, which is not sufficient to release air confinements existing inside during the reflow to the outside.

On the other hand, since SnSb-based alloy powder containing Sn as in the present invention contains Sn which remains in the powder without being consumed when SnSb is formed, an Sn phase or an Sn-based alloy phase of the Sn-based powder can be easily wetted in connection with SnSb-based alloy powder. For this reason, air confinements remaining during reflow can easily move to the outside, and the generation of voids can be suppressed.

It is desirable that the content of Sn of the SnSb-based alloy powder of the present invention has such an amount that Sn remains even after SnSb-intermetallic compound is formed in order to facilitate compatibility with the Sn-based powder. The Sn content of the SnSb-based alloy powder of the present invention is preferably 40-90%, more preferably 50-85%.

The SnSb-based alloy powder of the present invention may contain an optional element as long as the above effects are not impaired. As optional elements, the SnSb-based alloy powders may include at least one of Ag: 25% or less, Cu: 10% or less, Ni: 0.1% or less, P: 0.1% or less, Ge: 0.1% or less, Fe: 0.1% or less, Bi: 20% or less, Al: 0.1% or less, Ga: 0.1% or less, Pd: 0.1% or less, Cr: 0.1% or less, Co: 0.1% or less, Zn: 10% or less, Zr: 0.1% or less, Mn: 0.1% or less, Si: 0.1% or less, Ti: 0.1% or less, V: 0.1% or less, Nb 0.1% or less and Mo: 0.1% or less.

Further, the SnSb-based alloy powder of the present invention may contain two or more of the above-mentioned solder alloys. When two or more kinds of the above-mentioned solder alloys are contained, it is sufficient that a liquidus temperature of at least one kind of the solder alloys is higher than the liquidus temperature of the Sn-based powder. Further, the content of the SnSb-based alloy powder is preferably less than 50 mass % relative to the total mass of the solder paste.

The SnSb-based alloy powder of the present invention does not maintain its initial form at the time of introducing into the paste after reflow since Sn of the SnSb-based alloy powder is molten into the Sn phase and/or the Sn-based alloy phase of the Sn-based powder. The solder joint after the reflow has a structure in which intermetallic compound phase of the SnSb-based alloy powder or the like is dispersed in the Sn phase or the Sn-based alloy phase. Even when a solidus temperature of the SnSb-based alloy powder is higher than the reflow temperature, the Sn phase or the Sn-based alloy phase is wetted in connection with Sn of the SnSb-based alloy powder, and the SnSb-intermetallic compound or the like in the SnSb-based alloy powder is diffused into the Sn phase and/or the Sn-based alloy phase, and thus does not maintain the initial form at the time of introducing into the paste after reflow. In addition, since the solder paste according to the present invention contains at least two types of solder powders with Sn and thus they are compatible with each other, no intermetallic compound may not be formed between the two powders.

Since the SnSb-based alloy powder of the present invention contains Sn, the liquidus temperature of the SnSb-based alloy powder is allowed to be much higher than a heating peak temperature during reflow. The liquidus temperature of the SnSb-based alloy powder may be the heating peak temperature+10° C. or higher, the heating peak temperature+50° C. or higher, the heating peak temperature+100° C. or higher, or the heating peak temperature+120° C. or higher. Thus, even if SnSb-based alloy powder with a high liquidus temperature is used, a solder joint with excellent reliability can be formed according to the present invention.

The SnSb-based alloy powder of the present invention may contain unavoidable impurities in addition to the above-mentioned additional elements. Even if unavoidable impurities are contained, the effects as described above may not be affected.

(3) Content Ratio of Sn-Based Powder and SnSb-Based Alloy Powder, Etc.

A content ratio of the Sn-based powder and SnSb-based alloy powder of the present invention should be 75:25 to 95:5 in order to maintain the wettability of the molten solder during reflow. This content ratio is a mass ratio between the respective powders. When the content ratio of the Sn-based powder is less than 75, the SnSb-based alloy powder is not sufficiently wet with the Sn phase and/or the Sn-based alloy phase, as a result, voids are generated. On the other hand, if the content ratio of the SnSb-based alloy powder is less than 5, the Sb content in the solder joint may not reach a target value of 0.5% according to the present invention. The content ratio of the Sn-based powder and the SnSb-based alloy powder is preferably from 80:20 to 90:10.

When the target value of the Sb content in the solder joint is fixed, the content ratio of the SnSb-based alloy powder decreases and the content ratio of the Sn-based powder decreases simultaneously as the content of Sb in the SnSb-based alloy powder increases. Therefore, with the solder paste according to the present invention, the SnSb alloy powder can be easily melted into the Sn phase and/or the Sn-based alloy phase during the reflow, and the generation of voids can be suppressed and the reliability of the solder joint can be secured.

The total amount of the Sn-based powder and the SnSb-based alloy powder may be any amount which enables forming a solder joint, and is preferably, for example, 85 to 95% relative to the total mass of the solder paste.

The solder powder used in the solder paste according to the present invention is preferably a spherical powder. The flowability of the solder alloy is improved when the solder alloy is the spherical powder.

Further, in case that the solder alloy is a spherical powder, the diameter of the sphere is preferably 0.1 to 100 μm. If the spherical diameter of the solder material as the spherical powder is within the above range, fine soldering is possible. In the case where the solder alloy is a spherical powder, soldering to fine components is possible if the solder alloy has a size (particle size distribution) corresponding to the symbols 1 to 8 according to the powder size classification (Table 2) of JIS (Japanese Industrial Standard) Z 3284-1: 2014. The size of the particulate solder material is more preferably a size corresponding to the symbols 4 to 8, and more preferably a size corresponding to the symbols 5 to 8. The sphericity is preferably 0.90 or more, more preferably 0.95 or more, and most preferably 0.99 or more.

According to the present invention, the spherical diameter and the sphericity of the solder alloy as a spherical powder are measured by using a CNC image measuring system (Ultra Quick Vision ULTRA QV350-PRO measuring device manufactured by Mitutoyo) with the minimum zone center method (MZC method). In the embodiment, the sphericity represents a deviation from a perfect sphere, and is, for example, an arithmetic average value calculated by dividing the respective diameters of the 500 balls by a major axis, wherein the value which is closer to an upper limit of 1.00 represents that it is closer to the perfect sphere.

(5) Flux

The flux of the present invention is not particularly limited as long as it allows soldering by an ordinary method. Therefore, an appropriate mixture of a commonly used rosin, organic acid, activator and solvent may be used. The flux content is not particularly limited, but is preferably 5 to 15% relative to the total mass of the solder paste.

2. Method for Producing Solder Paste

The solder paste according to the present invention is produced by a method generally used in the art. For example, a rosin-based resin, an activator and a polymer component can be heated and mixed to prepare a flux, and then, the alloy powder as described above is introduced into the flux, followed by stirring and mixing to produce the solder paste.

3. Solder Joint Forming Method

Solder joint forming method by using the solder paste according to the present invention is implemented by printing the solder paste through a mask on a printed circuit board, mounting an electronic component, followed by heating to 160 to 240° C. in a reflow furnace. The heating temperature may be appropriately set depending on the composition of the alloy powder, and may be approximately the liquidus temperature of the Sn-based powder+10 to 30° C.

The solder paste of the present invention can enable the α-dose to be reduced by producing it using a low α-ray material. If this is used for bonding the periphery of a memory, soft errors can be suppressed.

Examples

—Preparation of Paste

For two types or one type of alloy powder comprising alloy compositions as shown in Tables 1 to 3, an alloy powder was prepared which has a spherical diameter of 21 μm and corresponds to 5 according to the powder size classification (Table 2) of JIS Z 3284-1: 2014. The content of each powder as shown in Tables 1 to 3 represents a mass ratio (mass %) with respect to a total mass of the powders. It was then mixed with a known paste-like rosin-based flux to prepare the solder pastes of Examples 1-45 and Comparative Examples 1-4. These solder pastes had 90% of the alloy powder relative to the total mass of the solder pastes.

—Void Area Ratio, Maximum Void Diameter

These pastes were printed with a thickness of 0.15 mm$^t$ on a Cu-OSP glass epoxy substrate by using a metal mask. Then, by using a mounter, QFN of 8 mm×8 mm×2 mm was placed on the paste. Thereafter, it was put into a reflow furnace, and reflow heating was performed under the condition of maintaining it in a temperature range of 220° C. or more for 40 seconds so that the peak temperature is 230° C. to form six samples of solder joint for each of Examples 1 to 45 and Comparative Examples 1 to 4.

With regard to the bonded state between the paste and the boards or dies, a plane X-ray radiophotograph of the sample of the solder joint with a zoom factor of 6.7 was taken by using the Micro Focus X-ray System XVR-160 of Uniheight System Co., Ltd., wherein a void area ratio and a maximum void diameter of a heat emitting portion of the QFN were determined.

The void area ratio was obtained by determining a ratio of the void area and the solder joint area (((void area)/(solder joint area))×100 [%]) for an X-ray transmission plane image of each of six samples and calculating an average value of four samples excluding two of the six samples which have a maximum value and a minimum value. In the Tables, "◯" was given for a void area ratio of 20% or less, while "x" was given for a void area ratio above 20%.

A maximum void diameter was defined as a diameter equivalent to that of a projected circle of a void with a largest area within each sample, wherein the void with the largest area was selected from an X-ray transmission plane image through visual observation. In the Tables, "◯" was given for a maximum void diameter of 3.0 mm or less, while "x" was given for a maximum void diameter above 3.0 mm.

—Shear Strength after 3000 Times of TCT

The solder pastes prepared as described above were printed on a 0.8 mm thick printed circuit board (material: FR-4) by using a 120 μm thick metal mask on a Cu electrode, and then a chip resistance component was mounted with a mounter, finally, reflow soldering was performed under the conditions of a maximum temperature of 240° C. for a maintaining duration of 60 s to prepare test boards.

These test boards were put into a heat cycle test apparatus which was set to conditions with a low temperature of −40° C., a high temperature of +125° C. and a maintaining duration of 30 minutes, wherein after 3000 cycles, a shear strength [N] was measured by using a shear strength measuring device (STR-1000 manufactured by RHESCA) under the condition of 6 mm/min. For a shear strength of 10 N or more, it was determined that it was at a level allows practical use without any problem, and classified as "◯" in the Tables. A shear strength less than 10N was classified as "x" in the Tables.

The results are shown in Tables 1 to 3. The numerical values for the alloy compositions as shown in Tables 1 to 3 represent the content [mass %] of each of the alloy compositions. Moreover, the balance is Sn for all the alloy compositions as shown in Tables 1 to 3.

TABLE 1

| | Sn-based powder | | | | SnSb-based alloy powder | | | | Sb-content in solder powder [mass %] | Void area ratio [%] | Maximum void diameter [mm] | Shear strength after 3000 times of TCT |
|---|---|---|---|---|---|---|---|---|---|---|---|---|
| | Alloy composition (Numbers represent mass %) (The balance is Bn) | Content [mass %] | Solidus Temperature [° C.] | Liquidus Temperature [° C.] | Alloy composition (Numbers represent mass %) (The balance is Bn) | Content [mass %] | Solidus Temperature [° C.] | Liquidus Temperature [° C.] | | | | |
| Example 1 | Sn-3Ag-0.5Cu | 90 | 217 | 220 | Sn-12Ag-1.5Cu-30Sb | 10 | 321 | 350 | 3 | ?(14.5) | ?(2.90) | ?(12N) |
| Example 2 | Sn-3Ag-0.5Cu | 80 | 217 | 220 | Sn-7.5Ag-1Cu-15Sb | 20 | 228 | 256 | 3 | ?(5.66) | ?(2.01) | ?(14N) |
| Example 3 | Sn-3Ag-0.5Cu | 75 | 217 | 220 | Sn-7.5Ag-1Cu-15Sb | 25 | 228 | 256 | 3.75 | ? | ? | ? |
| Example 4 | Sn-3Ag-0.5Cu | 95 | 217 | 220 | Sn-7.5Ag-1Cu-15Sb | 5 | 288 | 256 | 0.75 | ? | ? | ? |
| Example 5 | Sn-3Ag-0.5Cu | 80 | 217 | 220 | Sn-7.5Ag-1Cu-10Sb | 20 | 228 | 245 | 2 | ? | ? | ? |
| Example 6 | Sn-3Ag-0.5Cu | 80 | 217 | 220 | Sn-7.5Ag-1Cu-15Sb-0.03Ni | 20 | 228 | 264 | 3 | ? | ? | ? |
| Example 7 | Sn-3Ag-0.6Cu | 80 | 217 | 220 | Sn-10Sb | 20 | 245 | 266 | 2 | ? | ? | ? |
| Example 8 | Sn-0.7Cu | 80 | 227 | 229 | Sn-7.5Ag-1Cu-14Sb | 20 | 228 | 256 | 3 | ? | ? | ? |
| Example 9 | Sn-3.5Ag | 80 | 221 | 223 | Sn-7.5Ag-1Cu-15Sb | 20 | 228 | 256 | 3 | ? | ? | ? |
| Example 10 | Sn-58Bi | 80 | 139 | 141 | Sn-7.5Ag-1Cu-15Sb | 20 | 228 | 256 | 3 | ? | ? | ? |
| Example 11 | Sn-15.5In | 80 | 181 | 206 | Sn-7.5Ag-1Cu-15Sb | 20 | 228 | 256 | 3 | ? | ? | ? |
| Example 12 | Sn3Ag0.7Cu1Bi2.5In | 80 | 204 | 215 | Sn-7.5Ag-1Cu-15Sb | 20 | 228 | 256 | 3 | ? | ? | ? |
| Example 13 | Sn-3Ag-0.5Cu | 80 | 217 | 220 | Sn-7.5Ag-1Cu-15Sb-0.003P | 20 | 228 | 256 | 3 | ? | ? | ? |
| Example 14 | Sn-3Ag-0.5Cu | 80 | 217 | 220 | Sn-7.5Ag-1Cu-15Sb-0.01Ge | 20 | 228 | 256 | 3 | ? | ? | ? |
| Example 15 | Sn-3Ag-0.5Cu | 80 | 217 | 220 | Sn-7.5Ag-1Cu-15Sb-0.005Ga | 20 | 228 | 256 | 3 | ? | ? | ? |
| Example 16 | Sn-3Ag-0.5Cu | 80 | 217 | 220 | Sn-7.5Ag-1Cu-15Sb-0.01Zr | 20 | 228 | 256 | 3 | ? | ? | ? |
| Example 17 | Sn-3Ag-0.5Cu | 80 | 217 | 220 | Sn-7.5Ag-1Cu-15Sb-0.005Fe | 20 | 228 | 256 | 3 | ? | ? | ? |

TABLE 2

| | Sn-based powder | | | | SnSb-based alloy powder | | | | Sb-content in solder powder [mass %] | Void area ratio [%] | Maximum void diameter [mm] | Shear strength after 3000 times of TCT |
|---|---|---|---|---|---|---|---|---|---|---|---|---|
| | Alloy composition (Numbers represent mass %) (The balance is Bn) | Content [mass %] | Solidus Temperature [° C.] | Liquidus Temperature [° C.] | Alloy composition (Numbers represent mass %) (The balance is Bn) | Content [mass %] | Solidus Temperature [° C.] | Liquidus Temperature [° C.] | | | | |
| Example 18 | Sn-3Ag-0.5Cu | 80 | 217 | 220 | Sn-7.5Ag-1Cu-15Sb-0.01Al | 20 | 228 | 256 | 3 | ? | ? | ? |
| Example 19 | Sn-3Ag-0.5Cu | 80 | 217 | 220 | Sn-7.5Ag-1Cu-15Sb-0.1Zn | 20 | 228 | 256 | 3 | ? | ? | ? |
| Example 20 | Sn-3Ag-0.5Cu | 80 | 217 | 220 | Sn-7.5Ag-1Cu-15Sb-0.1Cr | 20 | 228 | 256 | 3 | ? | ? | ? |
| Example 21 | Sn-3Ag-0.5Cu | 80 | 217 | 220 | Sn-7.5Ag-1Cu-15Sb-0.02Pd | 20 | 228 | 256 | 3 | ? | ? | ? |
| Example 22 | Sn-3Ag-0.5Cu | 80 | 217 | 220 | Sn-7.5Ag-1Cu-15Sb-0.01Co | 20 | 228 | 256 | 3 | ? | ? | ? |
| Example 23 | Sn-3Ag-0.5Cu | 80 | 217 | 220 | Sn-7.5Ag-1Cu-15Sb-0.01Mn | 20 | 228 | 256 | 3 | ? | ? | ? |
| Example 24 | Sn-3Ag-0.5Cu | 80 | 217 | 220 | Sn-7.5Ag-1Cu-15Sb-0.01Si | 20 | 228 | 256 | 3 | ? | ? | ? |
| Example 25 | Sn-3Ag-0.5Cu | 80 | 217 | 220 | Sn-7.5Ag-1Cu-15Sb-0.05Ti | 20 | 228 | 256 | 3 | ? | ? | ? |
| Example 26 | Sn-3Ag-0.5Cu | 80 | 217 | 220 | Sn-7.5Ag-1Cu-15Sb-0.01V | 20 | 228 | 256 | 3 | ? | ? | ? |
| Example 27 | Sn-3Ag-0.5Cu | 80 | 217 | 220 | Sn-7.5Ag-1Cu-15Sb-0.1Bi | 20 | 228 | 256 | 3 | ? | ? | ? |
| Example 28 | Sn-3Ag-0.5Cu | 80 | 217 | 220 | Sn-7.5Ag-1Cu-15Sb-0.01Nb | 20 | 228 | 256 | 3 | ? | ? | ? |
| Example 29 | Sn-3Ag-0.5Cu | 80 | 217 | 220 | Sn-7.5Ag-1Cu-15Sb-0.05Ni | 20 | 228 | 276 | 3 | ? | ? | ? |
| Example 30 | Sn-3Ag-0.5Cu-0.003P | 80 | 217 | 220 | Sn-7.5Ag-1Cu-15Sb | 20 | 228 | 256 | 3 | ? | ? | ? |
| Example 31 | Sn-3Ag-0.5Cu-0.01Ge | 80 | 217 | 220 | Sn-7.5Ag-1Cu-15Sb | 20 | 228 | 256 | 3 | ? | ? | ? |
| Example 32 | Sn-3Ag-0.5Cu-0.005Ga | 80 | 217 | 220 | Sn-7.5Ag-1Cu-15Sb | 20 | 228 | 256 | 3 | ? | ? | ? |
| Example 33 | Sn-3Ag-0.5Cu-0.05Ni | 80 | 217 | 220 | Sn-7.5Ag-1Cu-15Sb | 20 | 228 | 256 | 3 | ? | ? | ? |
| Example 34 | Sn-3Ag-0.5Cu-0.005Fe | 80 | 217 | 220 | Sn-7.5Ag-1Cu-15Sb | 20 | 228 | 256 | 3 | ? | ? | ? |

TABLE 3

| | Sn-based powder | | | | SnSb-based alloy powder | | | | Sb-content in solder powder [mass %] | Void area ratio [%] | Maximum void diameter [mm] | Shear strength after 3000 times of TCT |
|---|---|---|---|---|---|---|---|---|---|---|---|---|
| | Alloy composition (Numbers represent mass %) (The balance is Bn) | Content [mass %] | Solidus Temperature [° C.] | Liquidus Temperature [° C.] | Alloy composition (Numbers represent mass %) (The balance is Bn) | Content [mass %] | Solidus Temperature [° C.] | Liquidus Temperature [° C.] | | | | |
| Example 35 | Sn-3Ag-0.5Cu-0.01Al | 80 | 217 | 220 | Sn-7.5Ag-1Cu-15Sb | 20 | 228 | 256 | 3 | ? | ? | ? |
| Example 36 | Sn-3Ag-0.5Cu-0.02Pd | 80 | 217 | 220 | Sn-7.5Ag-1Cu-15Sb | 20 | 228 | 256 | 3 | ? | ? | ? |
| Example 37 | Sn-3Ag-0.5Cu-0.1Cr | 80 | 217 | 220 | Sn-7.5Ag-1Cu-15Sb | 20 | 228 | 256 | 3 | ? | ? | ? |
| Example 38 | Sn-3Ag-0.5Cu-0.01Co | 80 | 217 | 220 | Sn-7.5Ag-1Cu-15Sb | 20 | 228 | 256 | 3 | ? | ? | ? |
| Example 39 | Sn-3Ag-0.5Cu-0.1Zn | 80 | 217 | 220 | Sn-7.5Ag-1Cu-15Sb | 20 | 228 | 256 | 3 | ? | ? | ? |
| Example 40 | Sn-3Ag-0.5Cu-0.01Zr | 80 | 217 | 220 | Sn-7.5Ag-1Cu-15Sb | 20 | 228 | 256 | 3 | ? | ? | ? |
| Example 41 | Sn-3Ag-0.5Cu-0.01Mn | 80 | 217 | 220 | Sn-7.5Ag-1Cu-15Sb | 20 | 228 | 256 | 3 | ? | ? | ? |
| Example 42 | Sn-3Ag-0.5Cu-0.01Si | 80 | 217 | 220 | Sn-7.5Ag-1Cu-15Sb | 20 | 228 | 256 | 3 | ? | ? | ? |
| Example 43 | Sn-3Ag-0.5Cu-0.05Ti | 80 | 217 | 220 | Sn-7.5Ag-1Cu-15Sb | 20 | 228 | 256 | 3 | ? | ? | ? |
| Example 44 | Sn-3Ag-0.5Cu-0.01V | 80 | 217 | 220 | Sn-7.5Ag-1Cu-15Sb | 20 | 228 | 256 | 3 | ? | ? | ? |
| Example 45 | Sn-3Ag-0.5Cu-0.01Nb | 80 | 217 | 220 | Sn-7.5Ag-1Cu-15Sb | 20 | 228 | 256 | 3 | ? | ? | ? |
| Comparative Example 1 | Sn-3Ag-0.5Cu | 0 | 217 | 220 | Sn-3.9Ag-0.6Cu-3Sb | 100 | 221 | 226 | 3 | x (49.4) | x (4.61) | ?(11N) |
| Comparative Example 2 | Sn-3Ag-0.5Cu | 95 | 217 | 220 | Sn-7.5Ag-1Cu-5Sb | 5 | 226 | 241 | 0.25 | ? | ? | x |
| Comparative Example 3 | Sn-3Ag-0.5Cu | 70 | 217 | 220 | Sn-7.5Ag-1Cu-15Sb | 30 | 228 | 256 | 4.5 | x | x | ? |
| Comparative Example 4 | Sn-3Ag-0.5Cu | 100 | 217 | 220 | Sn-7.5Ag-1Cu-15Sb | 0 | 228 | 256 | 0 | ? | ? | x |

Underlines indicate that corresponding data are outside the scope of the present invention.

As examples, Tables 1 to 3 show actual measurement values of Example 1, Example 2, and Comparative Example 1 shown in FIG. 2 as described below. As is clear from Tables 1 to 3, it was found that solder joints using the solder pastes of Examples 1 to 45 have a small void area ratio and a small maximum void diameter. In addition, the shear strength after TCT also showed a high value.

On the other hand, with regard to Comparative Example 1, since SnSb-based alloy powder with no Sn-based powder and with a small Sb content was used, voids were formed which have a large void area ratio and a large maximum void diameter. With regard to Comparative Examples 2 and 3, the shear strength after TCT was inferior due to a low Sb-content of SnSb-based alloy powder. Comparative Example 4 was inferior in shear strength after TCT because it did not contain SnSb-based alloy powder.

Figure 1:
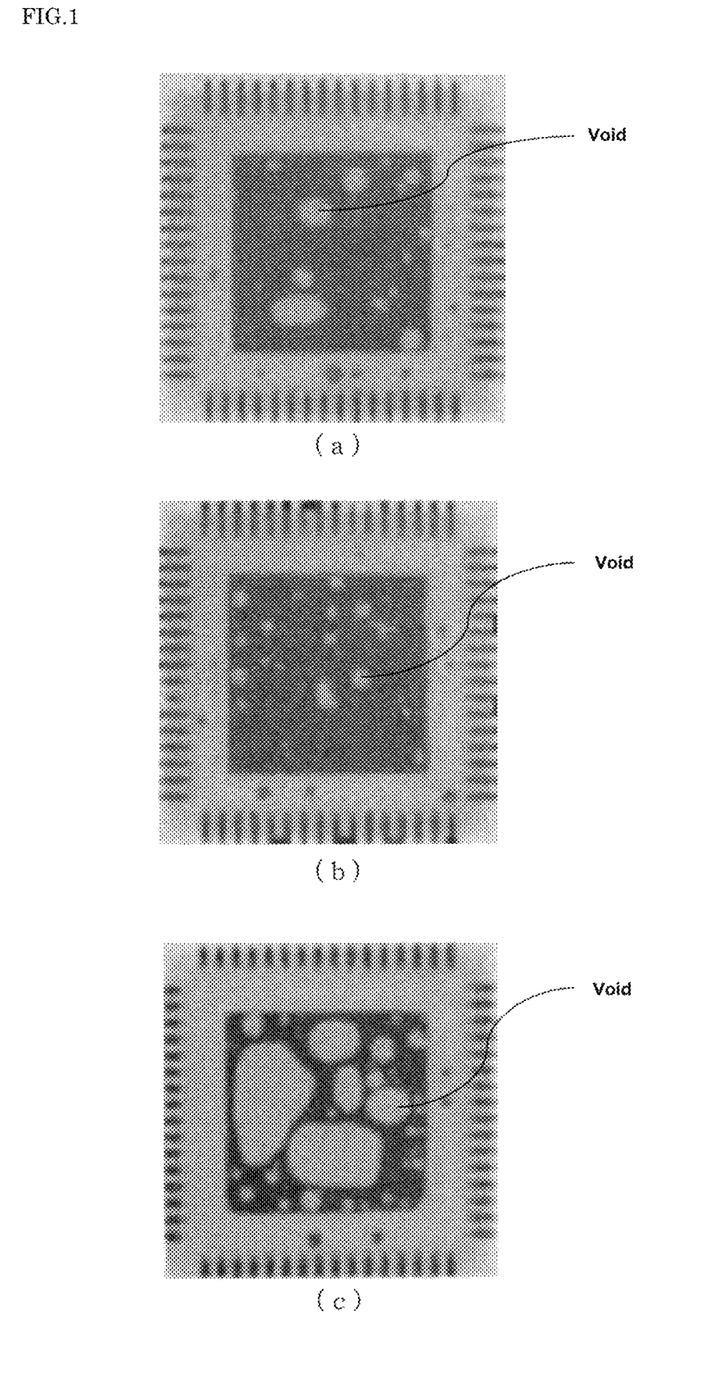

Example 1, Example 2, and Comparative Example 1 will be described in detail using photographs. FIG. 1 shows plane X-ray radiographs of solder joints after reflow with a peak temperature of 230° C. FIG. 1A is a plane X-ray radiograph of Example 1, FIG. 1B is a plane X-ray radiograph of Example 2, and FIG. 1C is a plane X-ray radiograph of Comparative Example 1. As shown in FIG. 1, it was found that the void area was smaller and the maximum void diameter was smaller according to Examples 1 and 2 than in Comparative Example 1.

Figure 2:
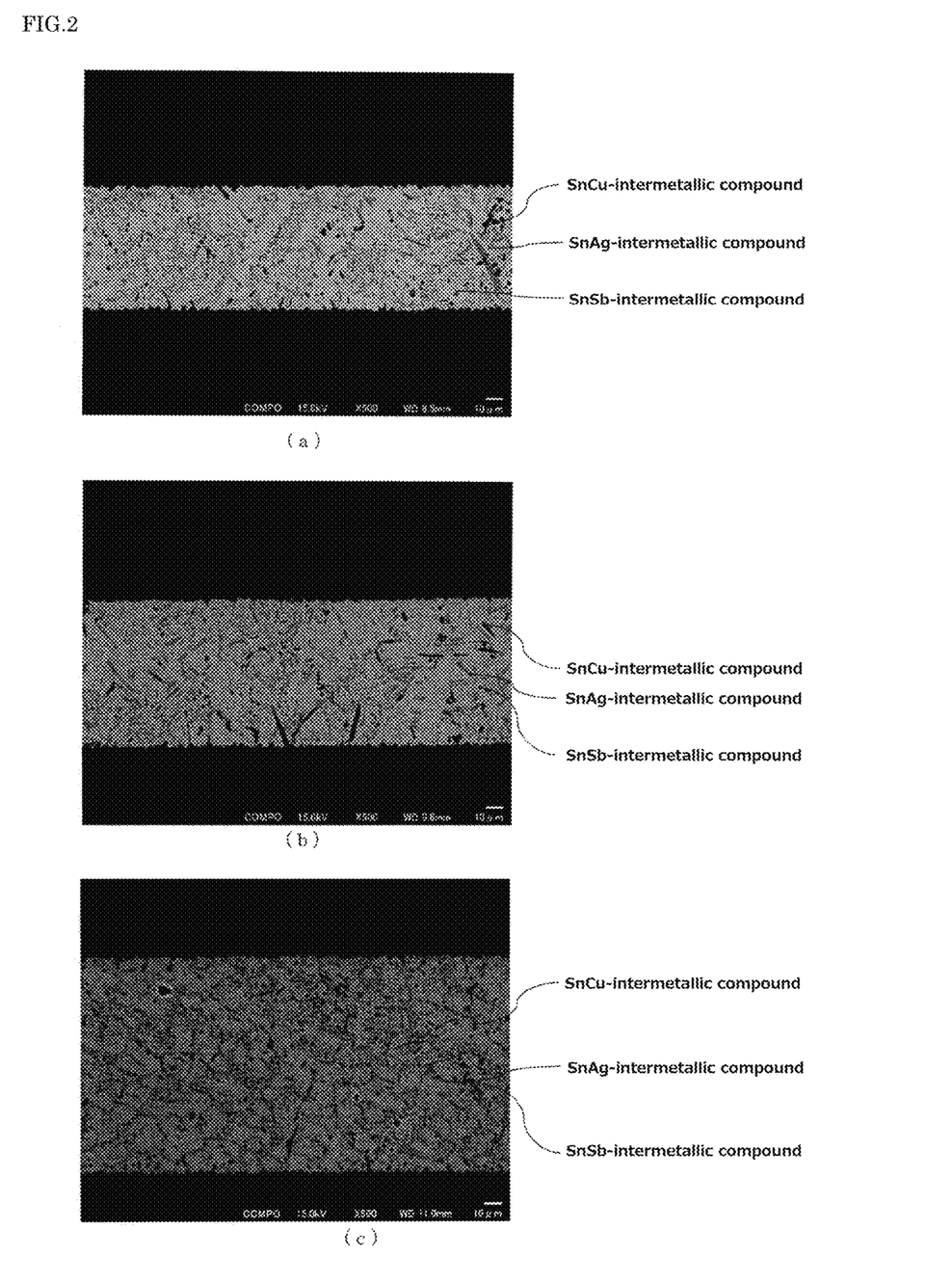

FIG. 2 shows cross-sectional SEM photographs of solder joints after reflow with a peak temperature of 230° C. FIG. 2A is across-sectional SEM photograph of Example 1, and FIG. 2B is a cross-sectional SEM photograph of Example 2, and FIG. 2C is a cross-sectional SEM photograph of Comparative Example 1. As shown in FIG. 2A, it was found that a solder joint was formed without any problem even in case of solder paste containing an alloy powder that does not melt even at a peak temperature of 240° C. As shown in FIG. 2B, it was found that a solder joint was formed without any problem even in case of solder paste containing an alloy powder which is semi-molten at a peak temperature of 240° C.

In both examples, it was found that original forms of the alloy powders were not to be observed. Furthermore, it was found that no intermetallic compound was formed on a surface of the SnSb-based alloy powder. In addition, it was found that the intermetallic compound was diffused in the Sn phase and the Sn-based alloy phase, and that the SnSb-based alloy powder was molten into the Sn phase and the Sn-based alloy phase.

Figure 3:
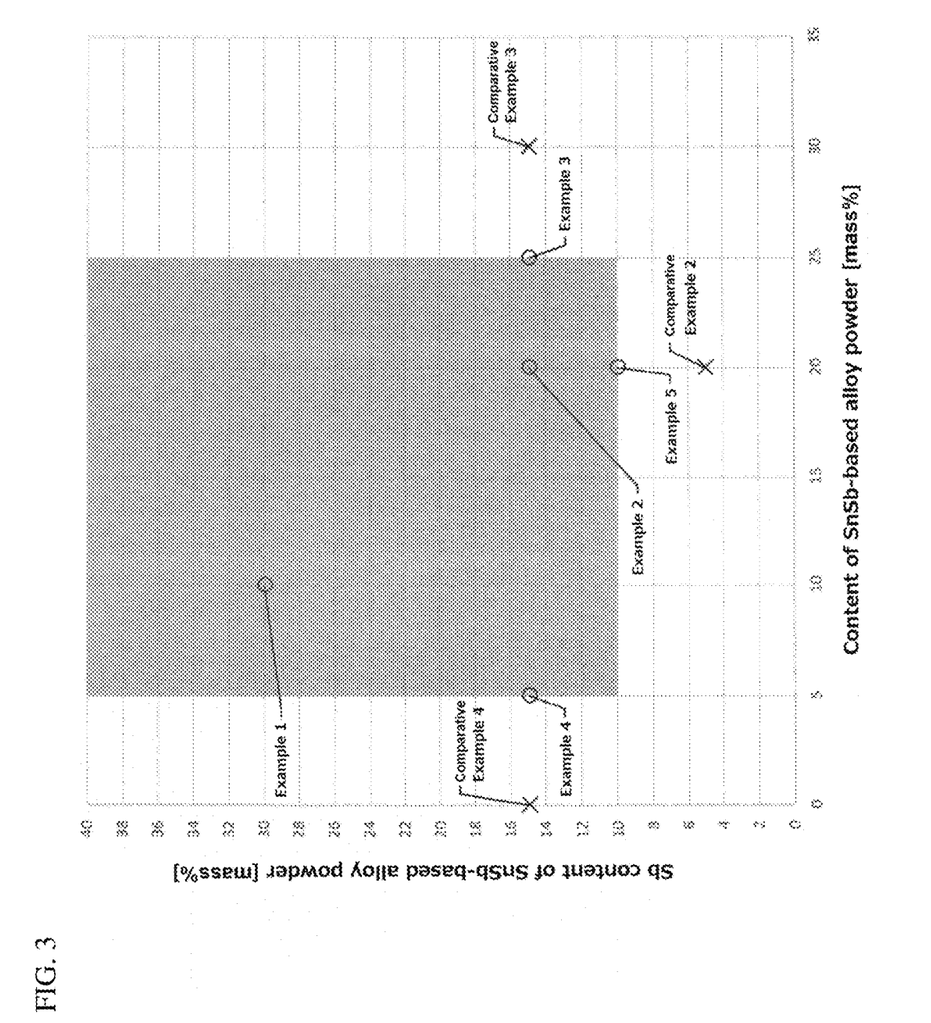
FIG. 3 is a graph showing a relationship between a content of SnSb-based alloy powder and an Sb content of SnSb-based alloy powder.

Moreover, a relationship between results shown in Tables 1 to 3 and the scope of the present invention will be described in detail with reference to FIG. 3. FIG. 3 is a graph showing a relationship between a content of the SnSb-based alloy powder and an Sb content of the SnSb-based alloy powder. In FIG. 3, the Examples 1 to 5 as well as Comparative Examples 2 to 4 in which alloy compositions of Sn-based powder is Sn-3Ag-0.5Cu (Ag: 3%, Cu: 0.5%, the balance: Sn) and alloy components of SnSb-based alloy powder is Sn-7.5 to 12Ag-1 to 1.5Cu-5 to 15Sb (Ag: 7.5 to 12%, Cu: 1 to 1.5%, Sb: 5 to 15%, the balance: Sn) were extracted from Tables 1 to 3. In FIG. 3, an area shown in gray translucent color indicates the scope of the present invention. The "content of SnSb-based alloy powder" on the horizontal axis indicates "content [ ]" of "SnSb-based alloy powder" shown in Tables 1 to 3.

As is clear from FIG. 3, it was found that solder paste that suppresses the generation of voids and has excellent reliability were Examples 1 to 5 which have an Sb-content of 10% or more in SnSb-based alloy powder and an SnSb-based alloy powder content of 5 to 25%, i.e. Sn-based powder: SnSb-based alloy powder is 75:25 to 95:5. In contrary, it was found that it was difficult to suppress the generation of voids and simultaneously achieve excellent reliability with Comparative Examples 2 to 4 which do not satisfy at least one of the above-mentioned requirements.

What is claimed is:

1. A solder paste comprising:
SnIn alloy powder consisting of more than 0 mass % to 80 mass % or less of In with the balance being Sn;
SnSb-based alloy powder containing Sn and 12 mass % or more of Sb; and
flux,
wherein a liquidus temperature of the SnSb-based alloy powder is higher than a liquidus temperature of the SnIn alloy powder, and wherein a mass ratio of the SnIn alloy powder and the SnSb-based powder is 80:20 to 95:5.

2. The solder paste according to claim 1, wherein the mass ratio of the SnIn alloy powder and the SnSb-based alloy powder is 80:20 to 90:10.

3. The solder paste according to claim 2, wherein the SnSb-based alloy powder contains at least one of Ag: 25 mass % or less, Cu: 10 mass % or less, Ni: 0.1 mass % or less, P: 0.1 mass % or less, Ge: 0.1 mass % or less, Fe: 0.1 mass % or less, Bi: 20 mass % or less, Al: 0.1 mass % or less, Ga: 0.1 mass % or less, Pd: 0.1 mass % or less, Cr: 0.1 mass % or less, Co: 0.1 mass % or less, Zn: 10 mass % or less, Zr: 0.1 mass % or less, Mn: 0.1 mass % or less, Si: 0.1 mass % or less, Ti: 0.1 mass % or less, V: 0.1 mass % or less, Nb: 0.1 mass % or less, and Mo: 0.1 mass % or less.

4. The solder paste according to claim 1, wherein the SnSb-based alloy powder contains at least one of Ag: 25 mass % or less, Cu: 10 mass % or less, Ni: 0.1 mass % or less, P: 0.1 mass % or less, Ge: 0.1 mass % or less, Fe: 0.1 mass % or less, Bi: 20 mass % or less, Al: 0.1 mass % or less, Ga: 0.1 mass % or less, Pd: 0.1 mass % or less, Cr: 0.1 mass % or less, Co: 0.1 mass % or less, Zn: 10 mass % or less, Zr: 0.1 mass % or less, Mn: 0.1 mass % or less, Si: 0.1 mass % or less, Ti: 0.1 mass % or less, V: 0.1 mass % or less, Nb: 0.1 mass % or less, and Mo: 0.1 mass % or less.

5. The solder paste according to claim 1, wherein the SnIn alloy powder and the SnSb-based alloy powder are spherical powders having a diameter of 0.1 to 100 um.

6. A solder paste comprising:
Sn-based powder, SnBi alloy powder consisting of 58 mass % or more to 80 mass % or less of Bi with balance being Sn, or SnIn alloy powder consisting of 15.5 mass % or more to 80 mass % or less of In with the balance being Sn;
SnSb-based alloy powder containing 30 mass % or more to 40 mass % or less of Sb; and
flux,
wherein the solder paste includes the Sn-based powder,
wherein a liquidus temperature of the SnSb-based alloy powder is higher than a liquidus temperature of the Sn-based powder, the SnBi alloy powder, or the SnIn alloy powder, and wherein a mass ratio of the Sn-based powder, the SnBi alloy powder, or the SnIn alloy powder and the SnSb-based powder is 90:10 to 95:5.

7. The solder paste according to claim 6, wherein the solder paste includes the Sn-based powder, and
wherein the Sn-based powder is at least one of Sn powder, SnAg-based alloy powder containing 4 mass % or less of Ag, SnCu-based alloy powder containing 2 mass % or less of Cu, and SnAgCu-based alloy powder containing 4 mass % or less of Ag and 2 mass % or less of Cu.

8. The solder paste according to claim 7, wherein the SnSb-based alloy powder contains at least one of Ag: 25 mass % or less, Cu: 10 mass % or less, Ni: 0.1 mass % or less, P: 0.1 mass % or less, Ge: 0.1 mass % or less, Fe: 0.1 mass % or less, Bi: 20 mass % or less, Al: 0.1 mass % or less, Ga: 0.1 mass % or less, Pd: 0.1 mass % or less, Cr: 0.1 mass % or less, Co: 0.1 mass % or less, Zn: 10 mass % or less, Zr: 0.1 mass % or less, Mn: 0.1 mass % or less, Si: 0.1 mass % or less, Ti: 0.1 mass % or less, V: 0.1 mass % or less, Nb: 0.1 mass % or less, and Mo: 0.1 mass % or less.

9. The solder paste according to claim 6, wherein the SnSb-based alloy powder contains at least one of Ag: 25 mass % or less, Cu: 10 mass % or less, Ni: 0.1 mass % or less, P: 0.1 mass % or less, Ge: 0.1 mass % or less, Fe: 0.1 mass % or less, Bi: 20 mass % or less, Al: 0.1 mass % or less, Ga: 0.1 mass % or less, Pd: 0.1 mass % or less, Cr: 0.1 mass % or less, Co: 0.1 mass % or less, Zn: 10 mass % or less, Zr: 0.1 mass % or less, Mn: 0.1 mass % or less, Si: 0.1 mass % or less, Ti: 0.1 mass % or less, V: 0.1 mass % or less, Nb: 0.1 mass % or less, and Mo: 0.1 mass % or less.

10. The solder paste according to claim 6, wherein the Sn-based powder, the SnBi alloy powder, the SnIn alloy powder, and the SnSb-based alloy powder are spherical powders having a diameter of 0.1 to 100 um.

* * * * *